United States Patent [19]

DuBosque, Jr.

[11] Patent Number: 5,343,219
[45] Date of Patent: Aug. 30, 1994

[54] CURSOR KEY ACTUATING ASSEMBLY

[76] Inventor: Clayton DuBosque, Jr., 302 Canoe Hill Rd., New Canaan, Conn. 06840

[21] Appl. No.: 980,505

[22] Filed: Nov. 23, 1992

[51] Int. Cl.⁵ .............................................. G09G 5/08
[52] U.S. Cl. .................................. 345/160; 345/145; 273/148 B; 200/6 A; 74/471 XY
[58] Field of Search ........................ 340/709, 710, 706; 200/6 A; 74/471; 273/148 B; 341/20, 22; 345/156, 157, 163, 145, 160, 161, 168

[56] References Cited

U.S. PATENT DOCUMENTS

| | | | |
|---|---|---|---|
| 3,827,313 | 8/1974 | Kiessling | 74/471 X |
| 4,575,591 | 3/1986 | Lugaresi | 340/709 |
| 4,639,668 | 1/1987 | Petit et al. | 340/709 |
| 4,786,768 | 11/1988 | Langewis et al. | 200/6 A |
| 4,825,019 | 4/1989 | Fisher | 340/709 |
| 4,945,357 | 7/1990 | Tal | 340/709 |
| 5,034,574 | 7/1991 | Martovitz | 200/6 A |

OTHER PUBLICATIONS

"Wesbster's II New Riverside University Dictionary", by the Riverside Publishing Company, p. 271.

*Primary Examiner*—Richard Hjerpe
*Assistant Examiner*—Lun-Yi Lao
*Attorney, Agent, or Firm*—Brooks Haidt Haffner & Delahunty

[57] ABSTRACT

A mounting structure including a clip portion embraces the nose of a computer keyboard housing with tabs that snap into the space between housing and keys for securing a toggle assembly over the cursor keys in an inverted "T" array cursor pad. A toggle assembly with radiating arms is held over the "DOWN" key with fingers resting on or in close proximity to all four cursor keys and joined through an elastomeric toroid to the mounting structure for resilient articulable motion in response to manual manipulation of a toggle lever to thereby provide joystick operation of the cursor via the cursor keys.

8 Claims, 3 Drawing Sheets

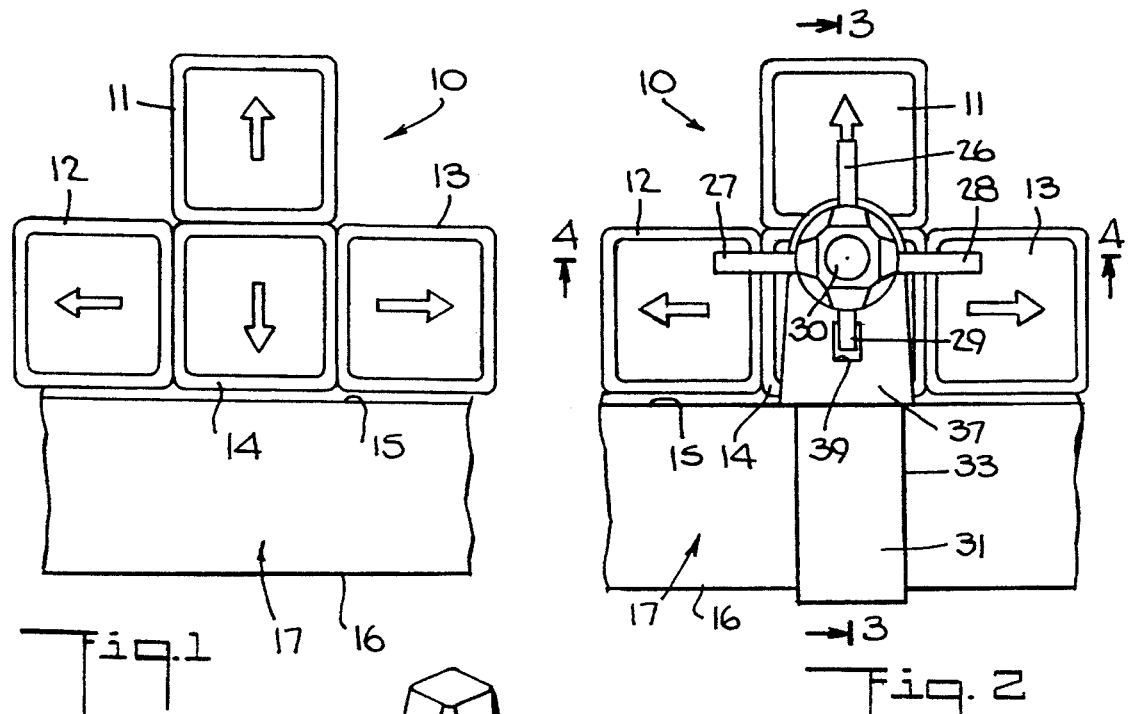
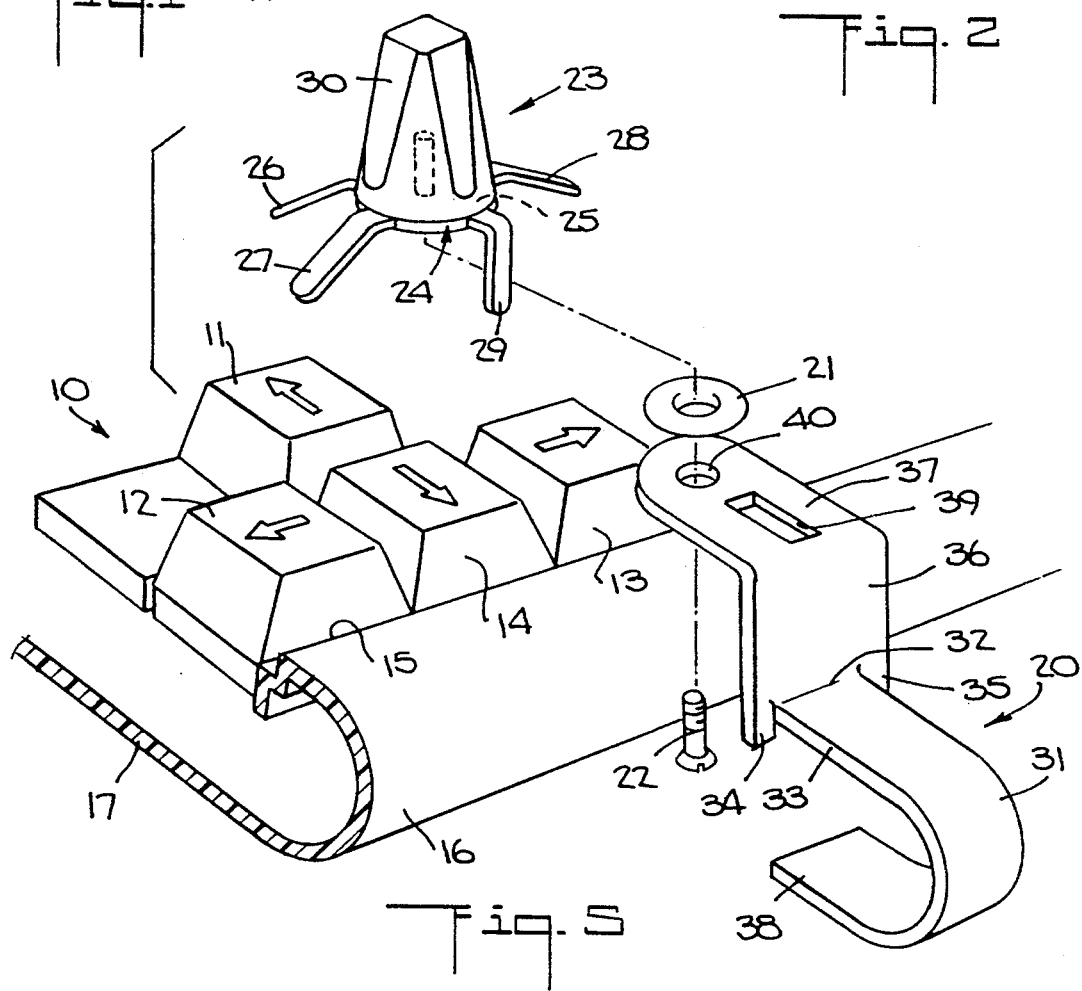

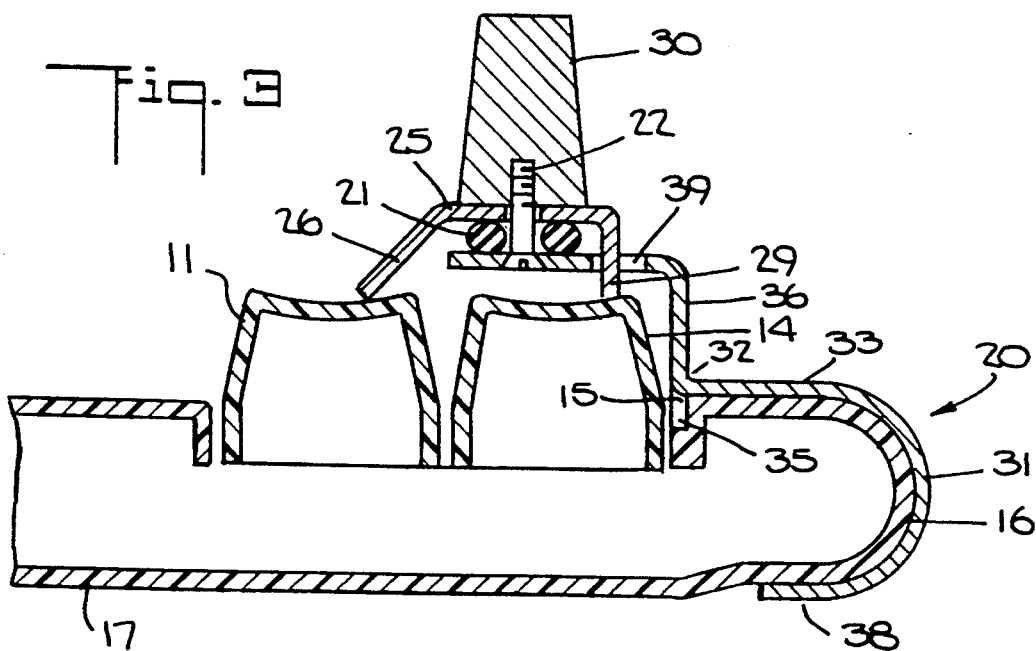
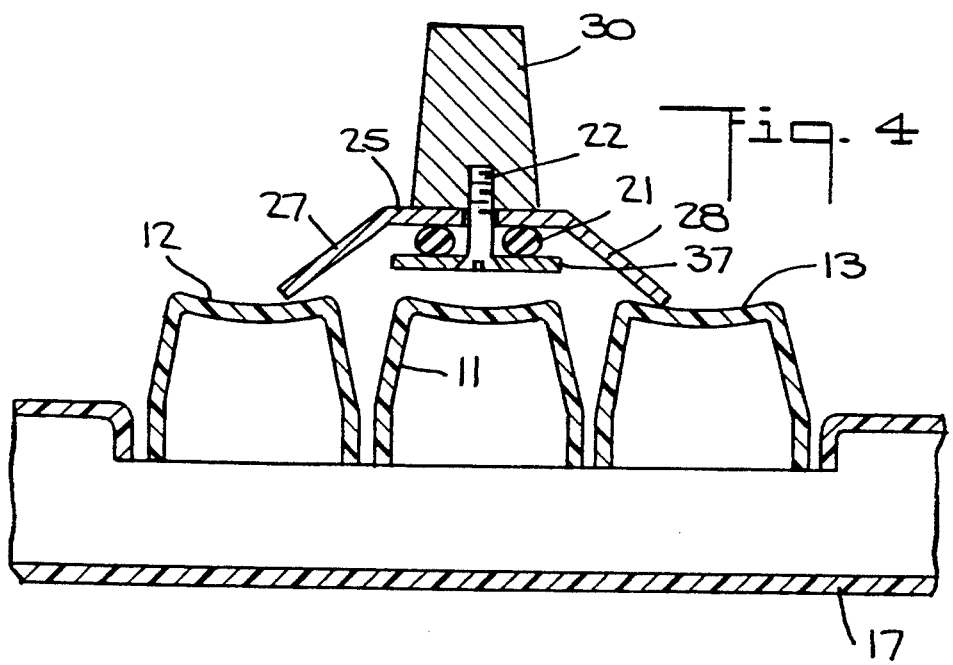
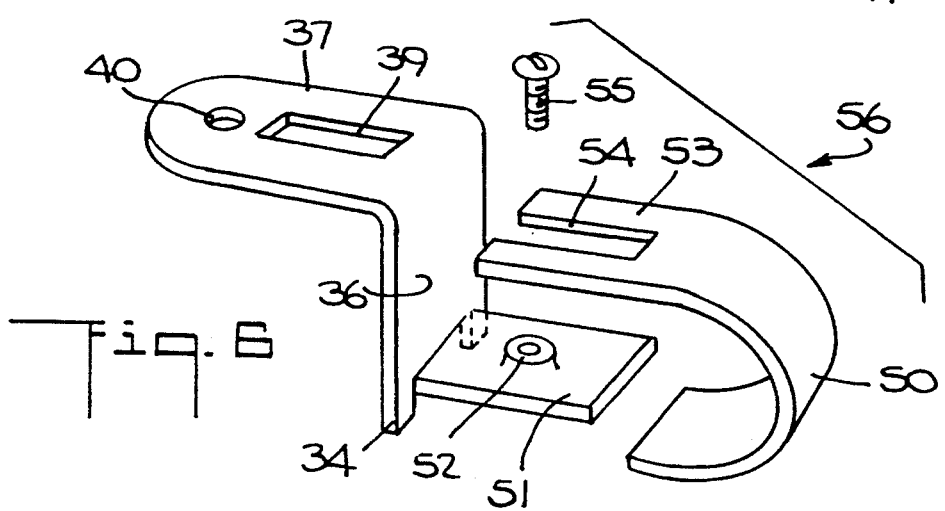

CURSOR KEY ACTUATING ASSEMBLY

BACKGROUND OF THE INVENTION

The present invention relates to assemblies for providing toggle or joystick control of computer keyboard keys.

Keyboards for desktop computers are generally provided with four keys that cause the cursor to move up, down, to the left or to the right on the monitor screen. While many programs do not involve a cursor, word processing, many games, and the writing or changing of software may require extensive movement of a cursor. In addition, many menu-driven programs require selecting one or more choices presented, and, on computers that are not equipped with a mouse or a trackball, the same keys that are used to move a cursor are used to make the selection.

Because the cursor control keys are so frequently used, most keyboards provide a dedicated cursor-control key pad, which is physically separate both from the main alpha section and from the numerical key pad, (which generally can be switched to also provide cursor control). In a large number of such keyboards the dedicated cursor control pad has four keys arranged in the form of an inverted "T". Three keys in a line on the bottom row of the pad effect lefthand, downward, and righthand cursor movement, respectively, and a single key centered on the top row causes upward cursor movement.

A cursor-control key pad with this layout is difficult to use without looking away from the screen or the main section of the keyboard in order to find the desired key, particularly because the "down" key is on the same row as the keys that control sideways motion. A number of devices have been conceived to make these and other cursor control keys easier to use without visual search. Generally, they provide a lever, or joystick, which can be moved to the right, say to depress the key that causes righthand cursor movement, and to the left, upward or downward to produce corresponding cursor movements.

These devices generally fall into two categories-those which mount over the keyboard and contain a fixed pivot for the joystick or handle, and those which rest freely on the keyboard over a central key and are rocked in different directions to depress the desired adjacent keys. The latter, while simple and cheap to produce, can be easily knocked off or removed and taken away. In addition, if used on an inverted "T" type key pad, they must be centered on the "down" key and cannot operate that key unless a different means, such as a depressable plunger in the handle is provided.

The great majority of such known devices use a fixed pivot and key engaging arms which are either attached to the handle or mounted separately and actuated by movement of the handle. Most incorporate a mounting plate which clips over the back and front ends of the keyboard housing or is otherwise screwed or adhered to the housing, often covering keys that are not actuated by the joystick. One known device is cemented to an "unused" center key. Many of these devices are structured so as to give very precise action and feel and, as a result, are quite complicated, cumbersome and expensive.

SUMMARY OF THE INVENTION

It is an object of this invention to provide a cursor-control joystick for general use on a computer keyboard containing a cursor-control key pad in the form of an inverted "T" which mounts over the dedicated cursor-control key pad, can be quickly and simply installed or removed, is constructed from a minimum number of parts for reliability and low cost of production, is unobtrusive, and does not interfere with the use of other keys.

In accordance with the present invention there is provided a cursor key actuating assembly for providing joystick control of four computer keyboard cursor control keys that are arranged in an inverted "T" array with a "DOWN" key at the cross-arm/stem junction, a "RIGHT" and "LEFT" key to either side of said "DOWN" key, and an "UP" key adjacent said "DOWN" key, said assembly comprising in combination: a mounting structure for attaching said assembly to a keyboard housing adjacent said "T" array and including a clip portion and a support member with a support arm portion, the latter containing an aperture and being disposed relative to said clip portion for being positioned over and spaced above said "DOWN" key; a toggle assembly including a lever member and four key actuating arms extending laterally and downwardly from said lever member in a configuration resembling a quadrate cross, to terminate in respective free ends, said toggle assembly being disposed above said support arm portion with said key actuating arms extending downwardly below said support arm portion for positioning said free ends of the key actuating arms in proximity to a corresponding one of said cursor control keys, the key actuating arm that approaches said "DOWN" key extending through said aperture in said support arm portion; and means resiliently joining the center of said toggle assembly to said support arm portion for enabling resilient articulation of said toggle assembly relative to said support arm portion sufficient to depress a selected cursor control key to actuate the latter when said lever member is manipulated to rock said toggle assembly selectably in the direction of a selected one of said cursor control keys to actuate selectably one of said cursor control keys.

BRIEF DESCRIPTION OF THE DRAWINGS

The invention will be better understood after reading the following detailed description of the presently preferred embodiments thereof with reference to the appended drawings in which:

FIG. 1 is a top plan view of a dedicated cursor key pad of the inverted "T" configuration to which the present invention is directed;

FIG. 2 is the same view as in FIG. 1 but with a first embodiment of the present invention installed over the key pad;

FIG. 3 is a sectional view taken along the line 3—3 in FIG. 2;

FIG. 4 is a sectional view taken along the line 4—4 in FIG. 2;

FIG. 5 is an exploded perspective view showing the principal components that constitute the embodiment of FIGS. 2–4 prior to assembly and illustrating various details of construction;

FIG. 6 is an exploded perspective view of a modification of the mounting structure of FIG. 5.

The same reference numerals are used throughout the drawings to designate the same or similar parts.

DESCRIPTION OF THE PRESENTLY PREFERRED EMBODIMENTS

Figure 7:
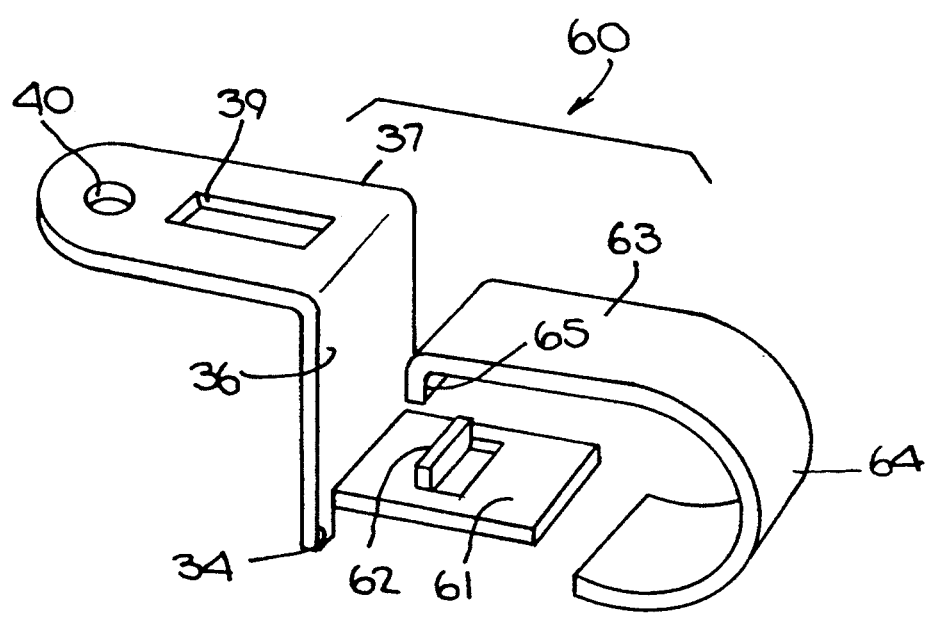
FIG. 7 is an exploded perspective view of a further modification of the mounting structure of FIG. 5.

Referring to FIG. 1, there is illustrated a cursor key pad 10 with cursor control keys 11, 12, 13 and 14 arranged in an inverted "T" array as found in a popular keyboard construction. The usual construction is to mount the keys of the keyboard on a sub-structure (not shown) which contains the electrical components for interconnecting the keys with the cabling for linking the keyboard with the main computer electronics. The keyboard sub-structure is encased in a housing or enclosure provided with openings through which the keys project, usually in groups. For the purpose of describing the present invention it is sufficient to consider the relation of the cursor keys, 11 to 14, to the edge 15 of the nose 16 of the housing 17 which is best seen in FIGS. 3 and 5.

The four keys, 11 to 14, are conventionally marked with respective arrows indicating the direction of movement of the cursor on the monitor screen under the control of the particular key. Thus, depressing key 11 will move the cursor up toward the top of the screen, key 12 will move the cursor to the left, key 13 will move the cursor to the right, and key 14 will move the cursor down toward the bottom of the screen. The four keys will be referred to as the "UP", "LEFT", "RIGHT" and "DOWN" keys.

Reference should now be directed to FIG. 5 which shows in an exploded view the principal components of a first embodiment of the invention. The cursor key actuating assembly consists of a support member 20, an elastomeric grommet or O-ring 21, a screw 22, and a toggle assembly 23. The assembly 23 consists of a cruciform member 24 resembling a quadrate cross with a ciruclar center region 25 from which extends laterally and downwardly the four arms of the cross, 26, 27, 28 and 29. Mounted over the central region 25 of the member 24 is a conveniently contoured toggle lever 30.

The support member 20 has a clip portion in the form of a generally U-shape element 31 for embracing the nose 16 of the keyboard housing as best seen in FIG. 3. Extending downwardly from the end 32 of the arm 33 of the support member 20 are a pair of tabs 34 and 35, while a connecting section 36 joins a support arm portion 37. The support arm portion 37 is generally parallel to the arms 33 and 38 of the U-shape element 31. A rectangular slotted aperture 39 is formed in the support arm portion 37 near the connecting section 36, while an aperture 40 is formed in the arm portion 37 near its free end as best seen in FIG. 5.

As shown in FIG. 3, the U-shape element 31 of the support member 20 is constructed to slip over and snugly embrace the nose 16 of the keyboard housing positioning the end 32 of arm 33 over the space between the edge 15 of the housing and the "DOWN" key 14. This places the tabs 34 and 35 where they can slip into the space between the "DOWN" key 14 and the edge 15 of the housing into engagement with the housing edge 15 upon resiliently straining the U-shape element. Thus, as best seen in FIG. 3, the support member 20 is securely engaged with the keyboard housing.

The parts are assembled with the elastomeric toroidal-like member 21 disposed over the support arm portion 37 in registration with the aperture 40 and beneath the center 25 of the toggle assembly 23. The screw 22 unites the parts by passing through aperture 40, through the member 21, and into the toggle assembly 23. When assembled as described, the arms of the cruciform member 24 extend downwardly below the support arm portion 37, and, when the assembly is installed on a keyboard, into proximity or contact with a corresponding one of the cursor keys 11 to 14. The arm 29 of the member 24 that cooperates with the "DOWN" key 14 extends through the slot 39 in the support arm portion 37. By arranging for a close fit between the arm 29 and the slot 39, the toggle assembly 23 is restrained from rotative movement. The connection of the toggle assembly 23 to the arm portion 37 is such that the cruciform configured arms can be resiliently manipulated for articulation relative to the support arm portion 37 sufficient to depress a selected cursor key to actuate the latter. The toggle lever 30 mounted on the center of the cruciform member 24 enables rocking the entire toggle assembly selectably in the direction of a selected one of the cursor keys 11 to 14 to actuate selectably one of the keys.

As best seen in FIGS. 2 and 3, the aperture 40 and the center of the toggle assembly 23 with its cruciform member 24 is positioned over the "DOWN" key offset from the center of the top of the "DOWN" key toward the "UP" key. The amount of offset from the center of the "DOWN" key is coordinated with a shortening of the lateral extension of the arm 29 so that each of the four arms 26, 27, 28 and 29 can depress its associated key with approximately equal leverage as the toggle assembly 23 is tilted or rocked, even though the keys are not arranged in the form of a symmetrical cross. The lesser lateral extension of the arm 29 is less than the front to back dimension of the top of the "DOWN" key 14.

It should be readily appreciated that the cursor key actuating assembly is constructed of a minimum of parts in an extremely simple fashion. The elastomeric toroid maintains the toggle in an upright neutral position until lateral force is applied to the lever member 30. The offset location of the center of the cruciform member positions all four arms over a respective cursor key.

In the embodiment described with reference to FIGS. 2 to 5, the support arm portion 37 and U-shape element 31 of the support member 20 are formed as an integral unit. Consequently, the overall assembly is designed to fit a particular model keyboard where the setback of the housing edge 15 from the front of the nose 16 is known and fixed. However, there is no standardization in housings from one model keyboard to the next and, therefore, the support member 20 will not fit all keyboards. In such case resort can be had to the modified embodiment shown in FIG. 6.

As shown in FIG. 6, the U-shape element 50 is formed separate from the extension 36 and horizontal arm portion 37, and a projecting section or tongue 51 containing a tapped hole 52 is formed at the lower end of extension 36. The arm 53 of the U-shape element 50 is elongated and provided with an elongated slot 54 along its centerline, here shown opening on the end of the arm 53. A machine screw 55 is provided for passing through the slot 54 and threadedly mating with hole 52 to join the parts together with adjustable spacing to accommodate the support member to different keyboards. In all other respects the cursor key actuating assembly would be the same as in FIGS. 1-5 although not shown in FIG. 6.

It should be apparent that the FIG. 6 embodiment with its means for adjustably joining the support arm portion 37 to the clip portion 50 provides for adjusting the position of the center of the toggle assembly relative to the setback distance of the "DOWN" key from the nose of the keyboard housing. At the same time it provides for adjusting the location of the tabs 34 and 35 that engage the edge 15 of the housing for different setback distances of edge 15.

Referring to FIG. 7, there is shown a further modification of the support member. The support member 60 is similar to the member 56 in FIG. 6, with a support arm portion 37 and an extension 36. However, the projecting section or tongue 61 is formed with an upstanding lip 62, and the arm 63 of the U-shape element 64 has a dependent flange 65 at its free end for engagement behind the lip 62.

While the invention has been described with reference to a specific construction of toggle assembly 23, the arms 26-29 could be formed as separate elements supported by the lever member 30, instead of as part of a separate cruciform body joined to the lever member. The center of the cruciform body need not be circular but could take on a polygonal shape. Similarly, the base of the lever member can be shaped other than circular.

Considering the various embodiments of the mounting structure, it should be appreciated that the support member part is generally "L"-shape with one leg constituting the support arm portion and the other leg having tab means, the tabs 34 and 35, at its end for insertion in the space between the "DOWN" key 14 and the adjacent housing edge 15 with the leg 36 substantially vertically disposed and the leg 37 disposed substantially horizontally.

Having described the presently preferred embodiments of the invention it should be understood that various changes in construction can be introduced without departing from the true spirit of the invention as defined in the appended claims.

What is claimed is:

1. A cursor key actuating assembly for providing joystick control of four computer keyboard cursor control keys that are arranged in proximity to the front of a computer keyboard housing in an inverted "T" array with a "DOWN" key at the cross-arm/stem junction, a "RIGHT" and "LEFT" key to either side of side "DOWN" key, and an "UP" key adjacent said "DOWN" key on the side remote from said front of said keyboard housing, said assembly comprising in combination: a mounting structure for attaching said assembly to said keyboard housing adjacent said "T" array, said mounting structure including a spring clip portion and a support member, said support member having a support arm portion which contains a first aperture and which is disposed relative to said clip portion for being positioned over in line with and spaced above said "DOWN" key when said clip portion is applied to embrace said front of said keyboard housing in line with said "DOWN" key; a toggle assembly including a lever member and four key actuating arms with said arms extending laterally from a common intersection at a first end of said lever member at right angles to each other and then downwardly relative to said lever member in a configuration resembling a quadrate cross to terminate in respective free ends, said toggle assembly being disposed above said support arm portion with said key actuating arms extending downwardly below said support arm portion for positioning said free ends of the key actuating arms in proximity to a corresponding one of said four cursor control keys, the key actuating arm that approaches said "DOWN" key extending through said aperture in said support arm portion which aperture is diemsioned to confine said last mentioned key actuating arm and prevent rotation of said key actuating arms about an axis perpendicular to said support arm portion; and means joining the center of said toggle assembly to said support arm portion for enabling atriculation of said toggle assembly relative to said support arm portion sufficient to depress a selected cursor control key to actuate the latter when said lever member is manipulated to rock said toggle assembly selectably in the direction of a selected one of said cursor control keys to actuate selectably one of said cursor control keys; said toggle assembly being joined to said support arm portion for locating said intersection of said key actuating arm over said "DOWN" key substantially centered laterally relative to said "DOWN" key but offset from the center of the top of said "DOWN" key into proximity with the rear edge of the top thereof; and said key actuating arm which is located for engaging said "DOWN" key extends laterally from said intersection of said arms a lesser distance than said other key actuating arms which lesser distance is less than the front to back dimension of the top of said "DOWN" key.

2. A cursor key actuating assembly according to claim 1, wherein said clip portion comprises a generally U-shape element for embracing said front of said keyboard housing with one arm of said U-shape element reaching a point over the space between the front of said "DOWN" key and the adjacent housing edge, and tab means integral with and projecting downwardly from said one arm of said U-shape element 3. A cursor key actuating assembly according to claim 2, wherein said support member is formed separate from said U-shape element, and means are provided for adjustably joining said support member to said clip portion for adjusting the position of said intersection of said key actuating arms relative to the setback distance of said front of said "DOWN" key from said front of said keyboard housing.

4. A cursor keyactuating assembly according to claim 2, wherein said support memebr is formed integral with said U-shape element.

5. A cursor key actuating assembly according to claim 1, wherein said support member is generally "L" shape with one leg contituting said support arm portion and the other leg having tab means at its end for insertion in the space between the front of said "DOWN" key and the adjacent housing edge when said other leg is substantially vertically disposed and said one leg is disposed substantially horizontally, said clip portion comprises a generally U-shape element for embracing said front of said keyboard housing with one arm of said U-shape element reaching a point near the front of said "DOWN" key, and said other leg of said support member is provided with means for engaging said one arm of said U-shape element to secure said mounting structure to said keyboard housing.

6. A cursor key actuating assembly according to claim 5, wherein said means for engaging said one arm of said U-shape element comprises a projecting section extending from said other leg of said support member in the opposite direction from said support arm portion, and said projecting section and said one arm of said U-shape element are provided with interengaging means for securing said U-shape element to said support member.

7. A cursor key actuating assembly according to claim 6, wherein said projecting section is provided with an upstanding lip, and said one arm of said U-shape element has a flange at its free end for engagement behind said upstanding lip.

8. A cursor key actuating assembly according to claim 6, wherein said one arm of said U-shape element is provided with a slot, and threaded means are provided for passing through said last mentioned slot for joining said clip portion to said projecting section of said support member.

* * * * *

UNITED STATES PATENT AND TRADEMARK OFFICE
CERTIFICATE OF CORRECTION

PATENT NO. : 5,343,219
DATED : August 30, 1994
INVENTOR(S) : Clayton DuBosque, Jr.

It is certified that error appears in the above-indentified patent and that said Letters Patent is hereby corrected as shown below:

Column 5, line 21, before "toggle" should be inserted --the--.
Column 5, line 48, "side of side" should read --side of said--.
Column 6, line 7, "diemsioned" should read --dimensioned--.
Column 6, line 12, "atriculation" should read --articulation--.
Column 6, line 20, "arm" should read --arms--.
Column 6, line 37, after "element" should include --for entering said space into engagement with said housing edge upon resiliently straining said U-shape element.--.
Column 6, line 46, "keyactuating" should read --key actuating--.
Column 6, line 47, "memebr" should read --member--.
Column 6, line 51, "contituting" should read --constituting--.

Signed and Sealed this

Third Day of January, 1995

Attest:

BRUCE LEHMAN

*Attesting Officer*  Commissioner of Patents and Trademarks